US012811039B2

(12) United States Patent
Iwasaki et al.

(10) Patent No.: US 12,811,039 B2
(45) Date of Patent: Nov. 24, 2026

(54) RARE EARTH SINTERED MAGNET, METHOD OF MANUFACTURING RARE EARTH SINTERED MAGNET, ROTOR, AND ROTATING MACHINE

(71) Applicant: Mitsubishi Electric Corporation, Tokyo (JP)

(72) Inventors: Akito Iwasaki, Tokyo (JP); Yukina Yoshioka, Tokyo (JP); Yoshio Tamura, Tokyo (JP); Akira Watarai, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 839 days.

(21) Appl. No.: 18/030,540

(22) PCT Filed: Oct. 29, 2020

(86) PCT No.: PCT/JP2020/040596
§ 371 (c)(1),
(2) Date: Apr. 6, 2023

(87) PCT Pub. No.: WO2022/091286
PCT Pub. Date: May 5, 2022

(65) Prior Publication Data

US 2023/0377783 A1 Nov. 23, 2023

(51) Int. Cl.
*H01F 1/057* (2006.01)
*B22F 3/16* (2006.01)
(Continued)

(52) U.S. Cl.
CPC .............. *H01F 1/0571* (2013.01); *B22F 3/16* (2013.01); *B22F 3/24* (2013.01); *B22F 9/04* (2013.01);
(Continued)

(58) Field of Classification Search
CPC ..................................................... H01F 1/0571
See application file for complete search history.

(56) References Cited

U.S. PATENT DOCUMENTS 7,048,808 B2 5/2006 Kaneko et al.
8,038,807 B2 10/2011 Morimoto et al.
(Continued)

FOREIGN PATENT DOCUMENTS

CN 1347123 A 5/2002
CN 101375352 A 2/2009
(Continued)

OTHER PUBLICATIONS

International Search Report and Written Opinion mailed on Jan. 19, 2021, received for PCT Application PCT/JP2020/040596, filed on Oct. 29, 2020, 8 pages including English Translation.
(Continued)

*Primary Examiner* — Peter F Godenschwager
(74) *Attorney, Agent, or Firm* — XSENSUS LLP

(57) ABSTRACT

A rare earth sintered magnet includes a plurality of regions of a main phase each having an $R_2Fe_{14}B$ crystal structure containing at least Nd as a rare earth element R and a grain boundary phase formed among the plurality of regions of the main phase. The grain boundary phase has Sm enriched portions in which Sm is enriched by Sm substitution in a crystalline NdO phase and heavy rare earth element RH enriched portions in which a heavy rare earth element RH is enriched at least on part of peripheries of the Sm enriched portions. This allows the heavy rare earth element RH to diffuse deeper into the rare earth sintered magnet while suppressing the deterioration of the magnetic properties.

12 Claims, 5 Drawing Sheets

(51) Int. Cl.

| | |
|---|---|
| ***B22F 3/24*** | (2006.01) |
| ***B22F 9/04*** | (2006.01) |
| ***C22C 38/00*** | (2006.01) |
| ***H01F 41/02*** | (2006.01) |
| ***H02K 1/02*** | (2006.01) |

(52) U.S. Cl.

CPC .......... *C22C 38/002* (2013.01); *C22C 38/005* (2013.01); *H01F 41/0266* (2013.01); *H02K 1/02* (2013.01); *B22F 2003/248* (2013.01); *B22F 2301/355* (2013.01); *B22F 2998/10* (2013.01); *B22F 2999/00* (2013.01)

(56) References Cited

U.S. PATENT DOCUMENTS

| | | | |
|---|---|---|---|
| 8,182,619 | B2 | 5/2012 | Morimoto et al. |
| 2002/0062884 | A1 | 5/2002 | Kaneko et al. |
| 2008/0286595 | A1 | 11/2008 | Yoshimura et al. |
| 2010/0231338 | A1 | 9/2010 | Morimoto et al. |
| 2011/0260816 | A1 | 10/2011 | Morimoto et al. |
| 2012/0114515 | A1 | 5/2012 | Kaneko et al. |
| 2015/0235747 | A1 | 8/2015 | Miyamoto et al. |
| 2017/0221616 | A1 | 8/2017 | Iwasaki et al. |
| 2018/0277288 | A1 | 9/2018 | Iwasaki et al. |
| 2021/0242727 | A1 | 8/2021 | Kajita et al. |
| 2022/0336126 | A1 | 10/2022 | Iwasaki et al. |
| 2023/0079836 | A1 | 3/2023 | Iwasaki et al. |

FOREIGN PATENT DOCUMENTS

| | | | |
|---|---|---|---|
| CN | 109585112 | A | 4/2019 |
| JP | 2011-082467 | A | 4/2011 |
| JP | 2012-039100 | A | 2/2012 |
| JP | 6359232 | B1 | 7/2018 |
| JP | 2018-160669 | A | 10/2018 |
| JP | 6692506 | B1 | 5/2020 |
| WO | 2007/102391 | A1 | 9/2007 |
| WO | 2011/043158 | A1 | 4/2011 |
| WO | 2019/111328 | A1 | 6/2019 |
| WO | 2019/230457 | A1 | 12/2019 |
| WO | 2021/048916 | A1 | 3/2021 |
| WO | 2021/205580 | A1 | 10/2021 |

OTHER PUBLICATIONS

Notice of Reasons for Refusal mailed on Sep. 14, 2021, received for JP Application 2021-515237, 6 pages including English Translation.

Decision of Refusal mailed on Jan. 18, 2022, received for JP Application 2021-515237, 8 pages including English Translation.

Office Action issued Feb. 17, 2023 in corresponding Indian Patent Application No. 202227052995.

Office Action issued Mar. 24, 2023 in corresponding Chinese Patent Application No. 202080099374.7 with machine English translation thereof.

Office Action issued Feb. 24, 2025 in Chinese Patent Application No. 202080106644.2, 17 pages.

Office Action issued Feb. 28, 2025 in German Patent Application No. 11 2020 007 740.3, 12 pages.

Office Action issued May 1, 2024 in Korean Patent Application No. 10-2023-7012562, 11 pages.

Office Action issued Oct. 7, 2024 in Indian Patent Application No. 202327028576, 5 pages.

Japanese Office Action issued Jun. 6, 2023 in corresponding Japanese Patent Application No. 2022-045423 (with machine-generated English translation), 5 pages.

RARE EARTH SINTERED MAGNET, METHOD OF MANUFACTURING RARE EARTH SINTERED MAGNET, ROTOR, AND ROTATING MACHINE

CROSS-REFERENCE TO RELATED APPLICATION

The present application is based on PCT filing PCT/JP2020/040596, filed Oct. 29, 2020, the entire contents of which is incorporated herein by reference.

TECHNICAL FIELD

The present disclosure relates to a rare earth sintered magnet, a method of manufacturing the rare earth sintered magnet, a rotor including the rare earth sintered magnet, and a rotating machine including the rare earth sintered magnet.

BACKGROUND TECHNOLOGY

R-T-B system rare earth sintered magnets are magnets consisting primarily of a rare earth element R, a transition metal element T such as Fe or Fe partly substituted with Co, and boron B. The R-T-B system rare earth sintered magnets are used in industrial motors and other applications, and their operating environment temperature is over 100 deg C. Therefore, conventional R-T-B system rare earth sintered magnets contain heavy rare earth elements RH such as Dy and Tb for high heat resistance. However, there are concerns about the supply of the heavy rare earth elements RH because their resources are unevenly distributed and their production is limited. Means of reducing the use of the heavy rare earth elements RH include a grain boundary diffusion method. For example, in Patent Document 1, a heavy rare earth element RH is diffused into a grain boundary of an R-T-B system rare earth sintered magnet in which neodymium oxyfluoride is dispersed in a grain boundary phase. This allows the heavy rare earth element RH to diffuse into the grain boundary without being oxidized in the grain boundary phase, thereby reducing the amount of scarce heavy rare earth element RH used.

CITATION LIST

Patent Document

Patent Document 1:
Japanese unexamined patent publication 2011-82467

SUMMARY OF INVENTION

Technical Problem

However, when the neodymium oxyfluoride containing F, which is not beneficial to the magnetic properties, remains as a compound in the rare earth sintered magnet, the contents of the rare earth elements R and Fe, which are responsible for the magnetic properties, relatively decrease, and thus the magnetic properties deteriorate. The low content of the neodymium oxyfluoride can suppress the deterioration of the magnetic properties but does not allow the heavy rare earth elements RH to diffuse into the inside of the rare earth sintered magnet. Thus, in the grain boundary diffusion method, it is difficult to diffuse heavy rare earth elements RH into the inside of the rare earth sintered magnet while suppressing the deterioration of the magnetic properties.

The present disclosure is made to solve the above-described problem, and an object thereof is to provide a rare earth sintered magnet that allows a heavy rare earth element RH to diffuse deeper into the rare earth sintered magnet while suppressing the deterioration of the magnetic properties, a method of manufacturing the rare earth sintered magnet, a rotor including the rare earth sintered magnet, and a rotating machine including the rare earth sintered magnet.

Solution to Problem

A rare earth sintered magnet according to the present disclosure includes: a plurality of regions of a main phase each having an $R_2Fe_{14}B$ crystal structure containing at least Nd and Sm as rare earth elements R; and a grain boundary phase formed among the plurality of regions of the main phase, having a higher content of Sm than that in the main phase, and having Sm enriched portions in which Sm is enriched by Sm substitution in a crystalline NdO phase and heavy rare earth element RH enriched portions in which a heavy rare earth element RH is enriched at least on part of peripheries of the Sm enriched portions.

A method of manufacturing a rare earth sintered magnet according to the present disclosure includes: a pulverization process of pulverizing an R—Fe—B system rare earth magnet alloy containing Nd and Sm as rare earth elements R; a molding process of molding a powder of the R—Fe—B system rare earth magnet alloy to produce a compact; a sintering-and-aging process of sintering the compact at a temperature between 600 deg C and 1300 deg C and aging the compact at a temperature equal to or lower than the sintering temperature to produce a sintered compact; and a grain boundary diffusion process of adhering a heavy rare earth element RH to the sintered compact and performing a heat treatment to diffuse the heavy rare earth element RH into a grain boundary.

Advantageous Effects of Invention

According to the present disclosure, there is provided the grain boundary phase including the Sm enriched portions, in which Sm is enriched by the Sm substitution in the crystalline NdO phase, and the heavy rare earth element RH enriched portions, in which the heavy rare earth element RH is enriched at least on part of the peripheries of the Sm enriched portions; this allows the heavy rare earth element RH to diffuse deeper into the rare earth sintered magnet while suppressing the deterioration of the magnetic properties.

DESCRIPTION OF EMBODIMENTS

Embodiment 1

A rare earth sintered magnet 1 according to Embodiment 1 is an R—Fe—B system rare earth sintered magnet in which the contained rare earth element R is mainly composed of a light rare earth element RL and a heavy rare earth element RH. The light rare earth element RL includes at least Nd and Sm. Another light rare earth element RL may be included. The heavy rare earth element RH includes at least Dy or Tb.

Figure 1:
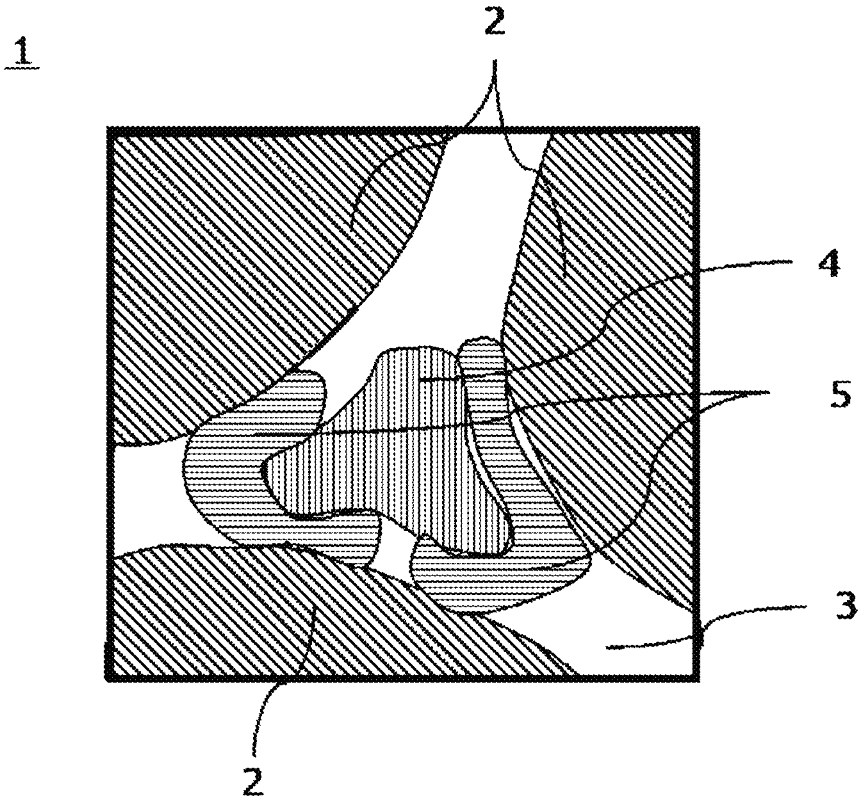
FIG. 1 is a schematic diagram of a part of a rare earth sintered magnet according to Embodiment 1.

A rare earth sintered magnet 1 according to Embodiment 1 is described with reference to FIG. 1. FIG. 1 is a schematic diagram of a part of the rare earth sintered magnet 1. The rare earth sintered magnet 1 includes a main phase 2 having an $R_2Fe_{14}B$ crystal structure containing at least Nd as the rare earth element R and a grain boundary phase 3 formed among a plurality of regions of the main phase 2. The grain boundary phase 3 includes Sm enriched portions 4, in which Sm is enriched by Sm substitution in a crystalline NdO phase, and heavy rare earth element RH enriched portions 5, in which a heavy rare earth element RH is enriched at least on part of peripheries of the Sm enriched portions 4.

The main phase 2 is made of a crystal grain based on, for example, an $Nd_2Fe_{14}B$ crystal structure. The magnetic properties can be improved with the average crystal grain size of the main phase 2 of, for example, less than 100 μm. Another rare earth element R, including Sm and the heavy rare earth element RH, may make a substitution at some of Nd sites of the $Nd_2Fe_{14}B$ crystal structure of the main phase 2.

The grain boundary phase 3 includes the Sm enriched portions 4, in which Sm is enriched by the Sm substitution in the crystalline NdO phase. As shown in FIG. 1, the Sm enriched portions 4 are partially enriched grain boundary phase 3. The Sm enriched portions 4 are dispersed throughout the grain boundary phase 3, not only in the surface layer of the rare earth sintered magnet 1, but also in the center of the magnet.

The grain boundary phase 3 includes the heavy rare earth element RH enriched portions 5 at least on part of the peripheries of the Sm enriched portions 4. The heavy rare earth element RH enriched portions 5 are portions of the grain boundary phase 3 in which the heavy rare earth element RH is more enriched than the other portions of the grain boundary phase 3 including the Sm enriched portions 4, and the main phase 2. The heavy rare earth element RH enriched portion 5 may exist on at least a part of the periphery of a Sm enriched portion 4 as shown in FIG. 1, or may exist so as to surround the entire periphery of a Sm enriched portion 4.

Next, the operation and effect of the present embodiment are described. For example, in Patent Document 1, F, which is an element not related to magnetic properties, remains as a compound inside the rare earth sintered magnet. As a result, the contents of the rare earth element R and Fe, which are responsible for magnetic properties, relatively decrease, which deteriorates the magnetic properties. In contrast, in the Sm enriched portions 4, Sm, which is a light rare earth element like Nd, makes a substitution at some of the Nd sites of the crystal structure of the NdO phase in the grain boundary phase 3. Consequently, Sm substitution is made in the crystalline NdO phase without adding elements not related to the magnetic properties, and this suppresses the deterioration of the magnetic properties.

In the conventional grain boundary diffusion method, a difference in the content of the heavy rare earth element RH at the interface between the main phase and the grain boundary phase serves as a driving force to diffuse the heavy rare earth element RH into the main phase. This consumes the heavy rare earth element RH that is diffused in the grain boundary phase. Furthermore, when the substitution by the heavy rare earth element RH is made in the $R_2Fe_{14}B$ crystal structure of the main phase, the residual magnetic flux density decreases due to the antiparallel coupling of the magnetic moment of the heavy rare earth element RH and that of Fe. In contrast, the rare earth sintered magnet 1 according to the present embodiment includes the grain boundary phase 3 having the heavy rare earth element RH enriched portions 5 in which the heavy rare earth element RH is enriched at least on part of the peripheries of the Sm enriched portions 4. This is considered to be a result of selective diffusion of the heavy rare earth element RH into at least a part of the grain boundary phase 3 on the peripheries of the Sm enriched portions 4 in a grain boundary diffusion process 31. Thus, the selective diffusion of the heavy rare earth element RH into the grain boundary on the peripheries of the Sm enriched portions 4 suppresses the permeation of the heavy rare earth element RH into the main phase 2. This suppresses the deterioration of the magnetic properties. Furthermore, the heavy rare earth element RH, which permeates the main phase to be consumed wastefully in the conventional method, diffuses in the grain boundary phase 3; this allows the heavy rare earth element RH to diffuse deeper into the rare earth sintered magnet 1 than with the conventional grain boundary diffusion method.

The Sm enriched portions 4 are dispersed throughout the grain boundary phase 3, not only in the surface layer of the rare earth sintered magnet 1, but also in the center of the magnet. Thus, the heavy rare earth element RH on the peripheries of the Sm enriched portions 4, which are dispersed from the surface layer to the center of the rare earth sintered magnet 1, selectively diffuses to the grain boundary. This reduces the heavy rare earth element RH staying in the grain boundary phase 3 including a multiple grain junction phase, and thus allows the heavy rare earth element RH to diffuse deeper into the rare earth sintered magnet 1 than with the conventional grain boundary diffusion method.

As described above, the rare earth sintered magnet 1 according to the present embodiment includes the grain boundary phase 3 having the Sm enriched portions 4, in which Sm is enriched by the Sm substitution in the crystalline NdO phase, and the heavy rare earth element RH enriched portions 5, in which the heavy rare earth element RH is enriched at least on part of the peripheries of the Sm enriched portions 4; this allows the heavy rare earth element RH to diffuse deeper into the rare earth sintered magnet 1 while suppressing the deterioration of the magnetic properties. In addition, by allowing the heavy rare earth element RH to diffuse deeper into the rare earth sintered magnet 1, the grain boundary diffusion speed is increased; this shortens the grain boundary diffusion time, saves the heavy rare earth element RH, and reduces the coercive force difference between the surface layer and center of the rare earth sintered magnet 1.

Note that an excessive Sm content may relatively decrease the content of Nd, which is an element having a high magnetic anisotropy constant and a high saturated magnetic polarization, and thus deteriorates the magnetic properties. Thus, the composition ratio of Nd and Sm in the rare earth sintered magnet 1 should be Nd>Sm, and the Sm content should be higher in the grain boundary phase 3 than in the main phase 2. This reduces the amount of Sm that makes substitution at the Nd sites of the $Nd_2Fe_{14}B$ crystal structure in the main phase 2, and thus suppresses the deterioration of the magnetic properties of the main phase 2.

The heavy rare earth element RH present in the main phase 2 contributes to the improvement of the coercive force but decreases the residual magnetic flux density because the magnetic moment of the heavy rare earth element RH and the magnetic moment of Fe are coupled antiparallel to each other. Thus, by making the content of the heavy rare earth element RH higher in the grain boundary phase 3 than in the main phase 2, the scarce heavy rare earth element RH can be saved while maintaining the magnetic properties with high residual magnetic flux density and high coercive force.

La may be contained as a light rare earth element RL. When the heavy rare earth element RH is diffused into the grain boundary in the rare earth sintered magnet 1 containing La, La in the grain boundary phase 3 is substituted with the heavy rare earth element RH. This allows the heavy rare earth element RH to diffuse deeper into the rare earth sintered magnet 1.

Additive elements that improve magnetic properties may be contained. The additive elements are, for example, one or more elements selected from Al, Cu, Co, Zr, Ti, Ga, Pr, Nb, Mn, Gd, and Ho.

Embodiment 2

Figure 2:
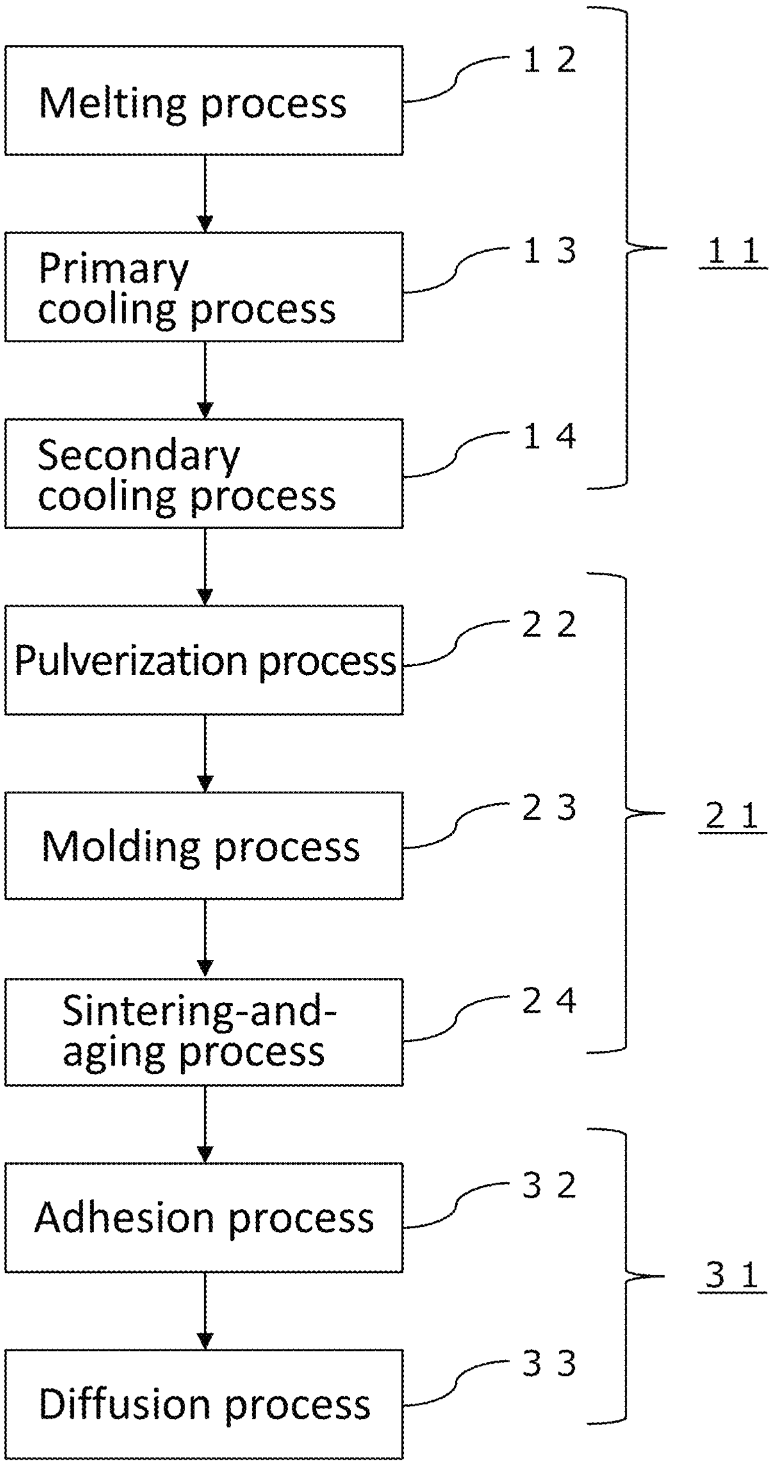
FIG. 2 is a flowchart showing a procedure of a method of manufacturing a rare earth sintered magnet according to Embodiment 2.
Figure 3:
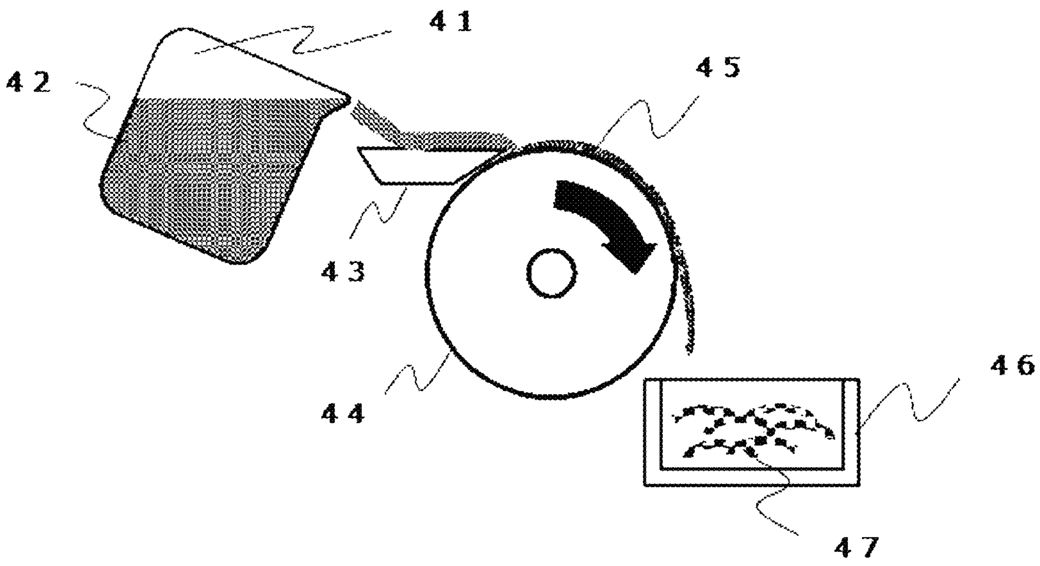
FIG. 3 is a schematic diagram showing an operation of a raw alloy production process 11 according to Embodiment 2.

The present embodiment relates to a method of manufacturing the rare earth sintered magnet 1 according to Embodiment 1. The description is made with reference to FIG. 2 and FIG. 3. FIG. 2 is a flowchart showing a procedure of the method of manufacturing the rare earth sintered magnet 1 according to the present embodiment. FIG. 3 is a schematic diagram showing an operation of a raw alloy production process 11. Hereinafter, the raw alloy production process 11, a sintered magnet production process 21, and a grain boundary diffusion process 31 are described separately.

[Raw Alloy Production Process 11]

As shown in FIG. 2 and FIG. 3, the raw alloy production process 11 includes: a melting process 12 in which a raw material of a rare earth magnet alloy 47 is heated to a temperature of 1000 K or higher and melted; a primary cooling process 13 in which the raw material in a molten state is cooled on a rotator 44 to produce a solidified alloy 45; and a secondary cooling process 14 in which the solidified alloy 45 is further cooled in a tray 46.

In the melting process 12, the raw material of the rare earth magnet alloy 47 is melted to produce a molten alloy 42. The raw material contains Nd, Fe, B, and Sm. La, Dy, Tb may be contained, and one or more elements selected from Al, Cu, Co, Zr, Ti, Ga, Pr, Nb, Mn, Gd, and Ho may be contained as additive elements. As exemplified in FIG. 3, in an atmosphere containing an inert gas such as Ar or in a vacuum, the raw material of the rare earth magnet alloy 47 is heated to a temperature of 1000 K or higher in a crucible 41 and melted to produce the molten alloy 42.

In the primary cooling process 13, as exemplified in FIG. 3, the molten alloy 42 is poured into a tundish 43 and rapidly cooled on the rotator 44, so that the solidified alloy 45 thinner than an ingot alloy is produced from the molten alloy 42. In FIG. 3, a single roll is exemplified as the rotator 44; however, twin rolls, a rotary disk, a rotary cast cylinder, etc. may be used for rapid cooling by making contact therewith. For efficient production of the thin solidified alloy 45, the cooling rate in the primary cooling process 13 should be 10 to 107 deg C/sec, preferably 103 to 104 deg C/sec. The thickness of the solidified alloy 45 is between 0.03 mm and 10 mm. The molten alloy 42 solidifies from the point where it contacts the rotator 44, and crystals grow in a columnar or needle-like shape in the direction of thickness from the surface of contact with the rotator 44.

In the secondary cooling process 14, the solidified alloy 45 is cooled in the tray 46 as exemplified in FIG. 3. When entering the tray 46, the thin solidified alloy 45 is broken into scale-like pieces of the rare earth magnet alloy 47 and cooled. Although the scale-like pieces of the rare earth magnet alloy 47 are exemplified, ribbon-like pieces of the rare earth magnet alloy 47 are produced depending on the cooling rate. For producing the rare earth magnet alloy 47 with the optimum rare earth magnet alloy internal structure, the cooling rate in the secondary cooling process 14 should be 0.01 to 105 deg C/sec, preferably 0.1 to $10^2$ deg C/sec.

Through the above-described raw alloy production process 11, the R—Fe—B system rare earth magnet alloy 47 containing at least Nd and Sm as rare earth elements R is produced.

[Sintered Magnet Production Process 21]

As shown in FIG. 2, the sintered magnet production process 21 includes: a pulverization process 22 in which the rare earth magnet alloy 47 produced in the above-described raw alloy production process 11 is pulverized; a molding process 23 in which the pulverized rare earth magnet alloy 47 is molded to produce a compact; a sintering-and-aging process 24 in which the compact is sintered and aged.

The pulverization process 22 is to pulverize the R—Fe—B system rare earth magnet alloy 47, which contains Nd and Sm as rare earth elements R and is produced in the above-mentioned raw alloy production process 11, and to produce a powder with a grain diameter of no more than 200 μm, preferably from 0.5 μm to 100 μm. The rare earth magnet alloy 47 is pulverized by using, for example, an agate mortar, a stamp mill, a jaw crusher, a jet mill, or the like. To obtain a powder with a small particle diameter, the pulverization process 22 should be performed in an atmosphere containing inert gas. The pulverization of the rare earth magnet alloy 47 in an atmosphere containing inert gas can also prevent oxygen from entering the powder. If the atmosphere in which the pulverization is performed does not affect the magnetic properties of the magnet, the pulverization of the rare earth magnet alloy 47 may be performed in the air.

In the molding process 23, the powder of the rare earth magnet alloy 47 is molded to produce a compact. For example, in the molding, only the powder of the rare earth magnet alloy 47 may be press-molded, or a mixture of the powder of the rare earth magnet alloy 47 and an organic binder may be press-molded. The molding may be performed while applying a magnetic field. The magnetic field to be applied is 2 T, for example.

The sintering-and-aging process 24 includes a sintering process and an aging process. In the sintering process, the compact is heat-treated. The sintering process is performed at a temperature of 600 deg C to 1300 deg C, for 0.1 hours to 100 hours, preferably 1 hour to 20 hours. Hot working may be added to provide magnetic anisotropy and improve coercive force. In the aging process, the compact is heat-treated at a temperature lower than that of the sintering process to produce a sintered compact. The aging process is performed at a temperature lower than that of the sintering process, for example, 300 deg C to 1000 deg C, for 0.1 hours to 100 hours, preferably 1 hour to 20 hours. The aging process may be divided into two stages, for example, a primary aging process and a secondary aging process. In this case, the temperature of the primary aging process is lower than the sintering temperature, preferably from 300 deg C to 1000 deg C. The time is from 0.1 hours to 100 hours, preferably from 1 hour to 20 hours. The secondary aging process is performed at a temperature lower than that of the primary aging process for 0.1 hours to 100 hours, preferably 1 hour to 20 hours. The sintering-and-aging process 24 should be performed in an atmosphere containing inert gas or in a vacuum to suppress oxidation. This process may be performed while applying a magnetic field.

The sintering-and-aging process 24 enables to produce the sintered compact provided with the plurality of regions of the main phase 2 each having the $R_2Fe_{14}B$ crystal structure containing at least Nd as the rare earth element R, and the grain boundary phase 3 having the Sm enriched portions 4 in which Sm is enriched by Sm substitution in the crystalline NdO phase.

[Grain Boundary Diffusion Process 31]

As shown in FIG. 2, the grain boundary diffusion process 31 includes an adhesion process 32 for adhering the heavy rare earth element RH to the sintered compact produced in the sintered magnet production process 21 to produce a diffusion precursor, and a diffusion process 33 for heat-treating the diffusion precursor to diffuse the heavy rare earth element RH into the grain boundary. In the diffusion process 33, the heavy rare earth element RH is selectively diffused into at least a part of the grain boundary phase 3 on the peripheries of the Sm enriched portions 4. In the grain boundary diffusion process 31, a known grain boundary diffusion method may be used. Various techniques have been proposed for the grain boundary diffusion method depending on the form of supply of the heavy rare earth element RH; typical examples thereof include a coating diffusion method, a sputtering diffusion method, and a vapor diffusion method. The grain boundary diffusion process 31 may be performed simultaneously with the sintering-and-aging process 24.

The grain boundary diffusion process 31 using the coating diffusion method is described. In the adhesion process 32, a slurry prepared by mixing a powdery heavy rare earth element RH compound with water or an organic solvent is adhered to the surface of the sintered compact to produce a diffusion precursor. The adhesion is performed by spraying, dip coating, spin coating, screen printing, electrodeposition, or the like. In the diffusion process 33, the heavy rare earth element RH is diffused into the inside of the diffusion precursor by heat-treating the diffusion precursor at a temperature equal to or lower than that of the sintering process. The heat treatment is performed at a temperature lower than that of the sintering process, for example, 300 deg C to 1000 deg C, for 0.1 hours to 100 hours, preferably 1 hour to 20 hours.

The grain boundary diffusion process 31 using the sputtering diffusion method is described. In the adhesion process 32, a thin film of an elemental metal or alloy composition of the heavy rare earth element RH is formed on the surface of the sintered compact in a dry environment to produce the diffusion precursor. In the diffusion process 33, the heavy rare earth element RH is diffused into the inside of the diffusion precursor by heat-treating the diffusion precursor at a temperature equal to or lower than that of the sintering process. The heat treatment is performed at a temperature lower than that of the sintering process, for example, 300 deg C to 1000 deg C, for 0.1 hours to 100 hours, preferably 1 hour to 20 hours.

The grain boundary diffusion process 31 using the vapor diffusion method is described. In the adhesion process 32, the sintered compact and a supply source of the heavy rare earth element RH are placed in a vacuum furnace. In the diffusion process 33, the heavy rare earth element RH is diffused into the inside of the diffusion precursor by heat-treating the diffusion precursor at a temperature equal to or lower than that of the sintering process. In the heat treatment, the heavy rare earth element RH is supplied to the diffusion precursor through a gas phase by vacuum heating. The heat treatment is performed at a temperature lower than that of the sintering process, for example, 600 deg C to 900 deg C, for 0.1 hours to 100 hours, preferably 1 hour to 20 hours. The vapor diffusion method can shorten the time of the grain boundary diffusion process 31 because the adhesion process 32 and the diffusion process 33 of the heavy rare earth element RH can be performed at the same time.

The grain boundary diffusion process 31 enables the production of the rare earth sintered magnet 1 including the grain boundary phase 3 having the heavy rare earth element RH enriched portions 5 in which the heavy rare earth element RH is enriched at least on part of the peripheries of the Sm enriched portions 4. In addition, in a 10 mm thick rare earth sintered magnet 1 produced by the manufacturing method according to the present embodiment, the coercive force difference between the surface layer and the center of the rare earth sintered magnet 1 was 20% or less. This is thought to be the result of the diffusion of the heavy rare earth element RH into the inside of the rare earth sintered magnet 1, resulting in a smaller coercive force difference between the surface layer and the center of the rare earth sintered magnet 1.

As described above, in the manufacturing method of the rare earth sintered magnet 1 according to the present embodiment, the R—Fe—B system rare earth magnet alloy 47 containing Nd and Sm as the rare earth elements R is pulverized, and then, through the sintering-and-aging process 24, the compact of the powder of the R—Fe—B system rare earth magnet alloy 47 is made into the sintered compact including the Sm enriched portions 4, in which Sm is enriched in a part of the grain boundary phase 3, and the heavy rare earth element RH is diffused into the sintered compact at the grain boundary. This enables the production of the rare earth sintered magnet 1 including the grain boundary phase 3 having the heavy rare earth element RH enriched portions 5, in which the heavy rare earth element RH is enriched at least on part of the peripheries of the Sm enriched portions 4. This allows the heavy rare earth element RH to diffuse deeper into the rare earth sintered magnet 1 while suppressing the deterioration of the magnetic properties.

When a fluoride powder is mixed with the rare earth magnet alloy, as in Patent Document 1, for example, the rare earth magnet alloy and the fluoride powder may not be mixed uniformly. In contrast, in the manufacturing method of the rare earth sintered magnet 1 according to the present embodiment, the raw material of the rare earth magnet alloy 47 containing Sm is melted to produce the molten alloy 42 in the melting process 12 of the raw alloy production process 11. Thus, elements such as Nd, Fe, and B are uniformly mixed with Sm. This enables the production of the rare earth sintered magnet 1 in which the Sm enriched portions 4 are uniformly dispersed throughout the grain boundary phase 3, not only in the surface layer of the rare earth sintered magnet 1, but also in the center of the magnet.

The manufacturing method of the rare earth sintered magnet 1 according to the present embodiment does not form a new compound such as neodymium oxyfluoride in the grain boundary phase, but forms the Sm enriched portions 4, in which Sm, which is a light rare earth element like Nd, is enriched and makes substitution at some of the Nd sites of the crystal structure of the NdO phase of the grain boundary phase 3 generated in the process of the sintered magnet production process 21 described above. This suppresses the deterioration of the magnetic properties.

Next, the evaluation results of the magnetic properties of the rare earth sintered magnet 1 produced by the manufacturing method according to the present embodiment are described with reference to Table 1. Table 1 summarizes the results of evaluating the magnetic properties of the samples of Examples 1 to 12 and Comparative Examples 1 to 8, which are rare earth sintered magnets 1 having different contents of Sm, La, Dy, and Tb (Dy and Tb being the heavy rare earth elements RH) and having different thicknesses. The coercive force difference in Table 1 is a value obtained by subtracting the coercive force of a 7 mm thick magnet from the coercive force of a 1.75 mm thick magnet.

TABLE 1

Evaluation results of magnetic properties of rare earth sintered magnets 1

| | General formula | Content (wt %) Sm | La | Dy | Tb | Magnet thickness (mm) | Residual magnet flux density (T) | Coercive force (kA/m) | Coercive force difference (kA/m) |
|---|---|---|---|---|---|---|---|---|---|
| Comparative Example 1 | Nd—Fe—B | 0 | 0 | 0 | 0 | 1.75 | 1.39 | 1500 | −2 |
| Comparative Example 2 | Nd—Fe—B | 0 | 0 | 0 | 0 | 7 | 1.39 | 1502 | |
| Comparative Example 3 | (Nd, Sm, La)—Fe—B | 0.25 | 0.25 | 0 | 0 | 1.75 | 1.36 | 1428 | 3 |
| Comparative Example 4 | (Nd, Sm, La)—Fe—B | 0.25 | 0.25 | 0 | 0 | 7 | 1.37 | 1425 | |
| Comparative Example 5 | (Nd, Dy)—Fe—B | 0 | 0 | 0.5 | 0 | 1.75 | 1.34 | 1941 | 221 |
| Comparative Example 6 | (Nd, Dy)—Fe—B | 0 | 0 | 0.5 | 0 | 7 | 1.33 | 1720 | |
| Comparative Example 7 | (Nd, Tb)—Fe—B | 0 | 0 | 0 | 0.5 | 1.75 | 1.33 | 2013 | 92 |
| Comparative Example 8 | (Nd, Tb)—Fe—B | 0 | 0 | 0 | 0.5 | 7 | 1.34 | 1821 | |
| Example 1 | (Nd, Sm, La, Dy)—Fe—B | 0.25 | 0.25 | 0.5 | 0 | 1.75 | 1.38 | 1942 | 201 |
| Example 2 | (Nd, Sm, La, Dy)—Fe—B | 0.25 | 0.25 | 0.5 | 0 | 7 | 1.36 | 1741 | |
| Example 3 | (Nd, Sm, La, Dy)—Fe—B | 0.75 | 0.75 | 0.5 | 0 | 1.75 | 1.37 | 1939 | 184 |
| Example 4 | (Nd, Sm, La, Dy)—Fe—B | 0.75 | 0.75 | 0.5 | 0 | 7 | 1.37 | 1755 | |
| Example 5 | (Nd, Sm, La, Dy)—Fe—B | 1.5 | 1.5 | 0.5 | 0 | 1.75 | 1.37 | 1850 | 149 |
| Example 6 | (Nd, Sm, La, Dy)—Fe—B | 1.5 | 1.5 | 0.5 | 0 | 7 | 1.36 | 1701 | |
| Example 7 | (Nd, Sm, La, Tb)—Fe—B | 0.25 | 0.25 | 0 | 0.5 | 1.75 | 1.38 | 2045 | 3 |
| Example 8 | (Nd, Sm, La, Tb)—Fe—B | 0.25 | 0.25 | 0 | 0.5 | 7 | 1.36 | 2042 | |
| Example 9 | (Nd, Sm, La, Tb)—Fe—B | 0.75 | 0.75 | 0 | 0.5 | 1.75 | 1.36 | 2044 | 3 |
| Example 10 | (Nd, Sm, La, Tb)—Fe—B | 0.75 | 0.75 | 0 | 0.5 | 7 | 1.37 | 2041 | |
| Example 11 | (Nd, Sm, La, Tb)—Fe—B | 1.5 | 1.5 | 0 | 0.5 | 1.75 | 1.37 | 2009 | 2 |
| Example 12 | (Nd, Sm, La, Tb)—Fe—B | 1.5 | 1.5 | 0 | 0.5 | 7 | 1.36 | 2007 | |

In the molding process 23, the press-molding is exemplified to produce the compact, but a heat-molding of a mixture of powder of the rare earth magnet alloy 47 and a resin may be used. The resin may be a thermosetting resin such as an epoxy resin, or a thermoplastic resin such as a polyphenylene sulfide resin.

The sintered compact described above may be produced by a one-alloy method or a two-alloy method, and the rare earth sintered magnet 1 may be produced by diffusing the heavy rare earth element RH into the grain boundary of the sintered compact.

The addition of La to the raw material of the rare earth magnet alloy 47 produces a sintered compact with a higher content of La in the grain boundary phase 3 than in the main phase 2. When the heavy rare earth element RH is diffused into the grain boundary of this sintered compact, the grain boundary diffusion is promoted because La is substituted with the heavy rare earth element RH. This allows the heavy rare earth element RH to diffuse deeper into the rare earth sintered magnet 1 while suppressing the deterioration of the magnetic properties.

The magnetic properties were evaluated by measuring the residual magnetic flux density and coercive force of each sample using a pulse excitation type B-H curve tracer. The maximum applied magnetic field by the B-H curve tracer is 5 T or higher, at which the sample is completely magnetized. Instead of the pulse excitation type B-H curve tracer, a DC recording magnetic flux meter, which is called a direct current type B-H curve tracer, a vibrating sample magnetometer (VSM), a magnetic property measurement system (MPMS), a physical property measurement system (PPMS), etc. may be used if they can generate a maximum applied magnetic field of 5 T or more. The measurements were performed in an atmosphere containing an inert gas such as nitrogen, and evaluation was performed at room temperature. With respect to the shape of each sample, the 7 mm thick magnet sample has a cube shape, and its length, width, and height are all 7 mm. The 1.75 mm thick magnet sample is a magnet processed to 7 mm in length, 7 mm in width, and 1.75 mm in height; four samples were stacked to form a 7 mm cube and measured.

The measurement error was +/−1%.

Comparative Example 1 and Comparative Example 2 are samples produced according to the above-described manufacturing method using Nd, Fe, and B as the raw materials of the rare earth magnet alloy so that the general formula will be Nd—Fe—B; the grain boundary diffusion process 31 was not performed. The magnet thickness of Comparative Example 1 is 1.75 mm, and that of Comparative Example 2 is 7 mm. The magnetic properties of these samples were evaluated by the methods described above. The residual magnetic flux densities of Comparative Examples 1 and Comparative Example 2 were 1.39 T. The coercive forces were 1500 kA/m and 1502 kA/m, respectively. The coercive force difference was −2 kA/m, which is a level of measurement error. Since the grain boundary diffusion process 31 was not performed for Comparative Example 1 and Comparative Example 2, there is little difference in coercive force depending on magnet thickness.

Comparative Example 3 and Comparative Example 4 are samples produced according to the above-described manufacturing method using Nd, Sm, La, Fe, and B as the raw materials of the rare earth magnet alloy so that the general formula will be (Nd, Sm, La)—Fe—B; the grain boundary diffusion process 31 was not performed. The magnet thickness of Comparative Example 3 is 1.75 mm, and that of Comparative Example 4 is 7 mm. The magnetic properties of these samples were evaluated by the methods described above. The residual magnetic flux density of Comparative Example 3 was 1.36 T, and that of Comparative Example 4 was 1.37 T. The coercive forces were 1428 kA/m and 1425 kA/m, respectively. The coercive force difference was 3 kA/m, which is a level of measurement error. Since the grain boundary diffusion process 31 was not performed for Comparative Example 3 and Comparative Example 4, there is little difference in coercive force due to magnet thickness.

Comparative Example 5 and Comparative Example 6 are samples in which Dy was diffused into the grain boundaries according to the above-described manufacturing method using Nd, Fe, and B as the raw materials of the rare earth magnet alloy so that the general formula will be (Nd, Dy)—Fe—B. The magnet thickness of Comparative Example 5 is 1.75 mm, and that of Comparative Example 6 is 7 mm. The magnetic properties of these samples were evaluated by the methods described above. The residual magnetic flux density of Comparative Example 5 was 1.34 T, and that of Comparative Example 6 was 1.33 T. Comparisons of these results with those of Comparative Example 1 and Comparative Example 2 show that the addition of Dy reduced the residual magnetic flux density. The coercive forces were 1941 kA/m and 1720 kA/m, respectively. The coercive force difference was 221 kA/m. These results suggest that Dy was not sufficiently diffused into the center of the magnet in Comparative Example 6, which is a 7 mm thick magnet, resulting in a difference in coercive force compared to Comparative Example 5, which is a 1.75 mm thick magnet. Compared to Comparative Example 1 and Comparative Example 2, the coercive forces were improved but the residual magnetic flux densities were reduced. This is because the diffusion of Dy into the grain boundaries improved the coercive forces, but the permeation of Dy into the main phase 2 lowered the residual magnetic flux densities.

Comparative Example 7 and Comparative Example 8 are samples in which Tb was diffused into the grain boundaries according to the above-described manufacturing method using Nd, Fe, and B as the raw materials of the rare earth magnet alloy so that the general formula will be (Nd, Tb)—Fe—B. The magnet thickness of Comparative Example 7 is 1.75 mm, and that of Comparative Example 8 is 7 mm. The magnetic properties of these samples were evaluated by the methods described above. The residual magnetic flux density of Comparative Example 7 was 1.33 T, and that of Comparative Example 8 was 1.34 T. Comparisons of these results with those of Comparative Example 1 and Comparative Example 2 show that the addition of Tb reduced the residual magnetic flux density. The coercive forces were 2013 kA/m and 1821 kA/m, respectively. The coercive force difference was 92 kA/m. These results suggest that Tb was not sufficiently diffused to the center of the magnet in Comparative Example 8, which is a 7 mm thick magnet, resulting in a difference in coercive force compared to Comparative Example 7, which is a 1.75 mm thick magnet. Compared to Comparative Example 1 and Comparative Example 2, the coercive forces were improved but the residual magnetic flux densities were reduced. This is because the diffusion of Tb into the grain boundaries improved the coercive force, but the permeation of Tb into the main phase 2 lowered the residual magnetic flux densities.

Examples 1 to 6 are samples in which Dy was diffused into the grain boundaries according to the above-described manufacturing method using Nd, Sm, La, Fe, and B as the raw materials of the rare earth magnet alloy 47 so that the general formula will be (Nd, Sm, La, Dy)—Fe—B. The magnetic properties of these samples were evaluated by the methods described above. The results show that the residual magnetic flux density of each of Examples 1 to 6 was higher than those of Comparative Example 5 and Comparative Example 6. This reflects the result of the selective grain boundary diffusion of Dy into at least part of the peripheries of the Sm enriched portions 4, which suppressed the permeation of Dy into the main phase 2. Compared to Comparative Example 5 and Comparative Example 6, the coercive force difference was small. Also, the coercive force difference decreased as the contents of Sm and La increased. This reflects the result of the selective grain boundary diffusion of Dy into the peripheries of the Sm enriched portions 4 that are dispersed from the surface to the center of the sintered rare earth magnet 1, thereby diffusing Dy deeper into the sintered rare earth magnet 1 than with the conventional grain boundary diffusion method. La is present in grain boundary phase 3 and promotes the permeation of Dy into the grain boundary.

Examples 7 to 12 are samples in which Tb was diffused into the grain boundaries according to the above-described manufacturing method using Nd, Sm, La, Fe, and B as the raw materials of the rare earth magnet alloy 47 so that the general formula will be (Nd, Sm, La, Tb)—Fe—B. The magnetic properties of these samples were evaluated by the methods described above. The results show that each residual magnetic flux density was higher than those of Comparative Example 7 and Comparative Example 8. This reflects the result of the selective grain boundary diffusion of Tb into at least part of the peripheries of the Sm enriched portions 4, which suppressed the permeation of Tb into the main phase 2. Compared to Comparative Example 7 and Comparative Example 8, the coercive force difference was small. This reflects the result of the selective grain boundary diffusion of Tb into the peripheries of the Sm enriched portions 4 that are dispersed from the surface to the center of the sintered rare earth magnet 1, thereby diffusing Tb deeper into the sintered rare earth magnet 1 than by using the conventional grain boundary diffusion method. La is present in grain boundary phase 3 and promotes the permeation of Tb into the grain boundary. Furthermore, the coercive force differences of Examples 7 to 12 are smaller than those of Examples 1 to 6. This shows that Tb is more effective than Dy as the heavy rare earth element RH.

Next, the evaluation results of the magnet internal structures of the rare earth sintered magnets 1 produced by the manufacturing method according to the present embodiment are described.

The magnet internal structures were evaluated by elemental analysis using a scanning electron microscope (SEM) and an electron probe micro analyzer (EPMA). Here, a field emission type electron probe microanalyzer (JXA-8530F manufactured by JEOL Ltd.) was used as the SEM and EPMA, and the elemental analysis was performed under evaluation conditions of an acceleration voltage of 15.0 kV, an irradiation current of $3.05e^{-007}$ A, an irradiation time of 10 ms, the number of pixels of 256×256 pixels, a magnification of 5000 times, and the number of integration times of 5.

Figure 4:
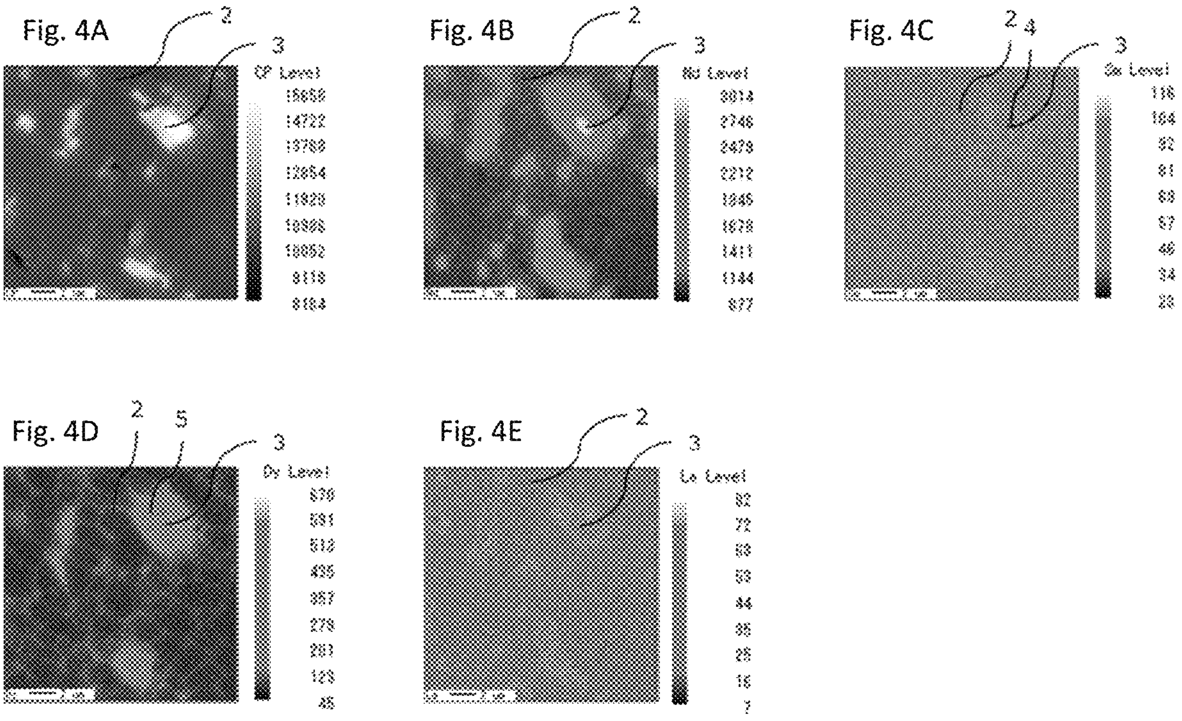
FIG. 4A to FIG. 4E are diagrams obtained by EPMA analysis of cross sections of rare earth sintered magnets manufactured by the method of manufacturing the rare earth sintered magnet according to Embodiment 2.
Figure 5:
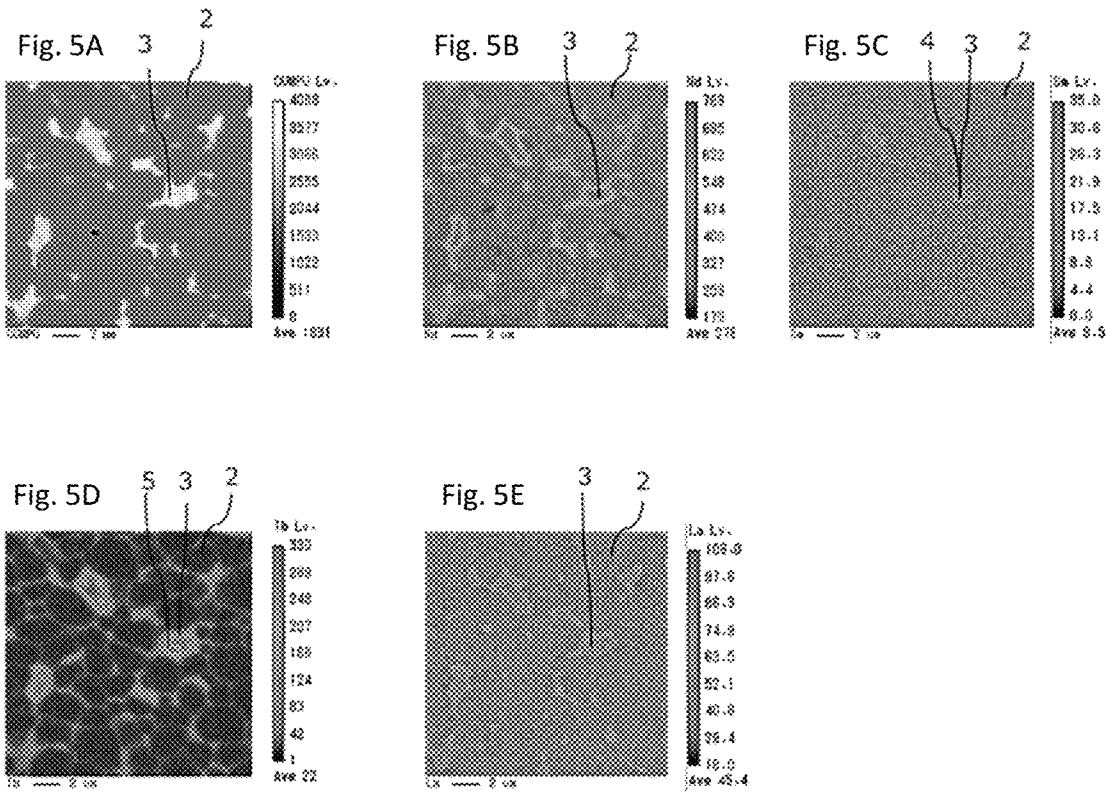
FIG. 5A to FIG. 5E are diagrams obtained by EPMA analysis of cross sections of rare earth sintered magnets manufactured by the method of manufacturing the rare earth sintered magnet according to Embodiment 2.

FIG. 4 shows cross sections of the rare earth sintered magnet 1 of Example 1 evaluated under the above-described evaluation conditions, in which FIG. 4A is a compositional image in backscattered electron mode, FIG. 4B is a mapping diagram of Nd, FIG. 4C is a mapping diagram of Sm, FIG. 4D is a mapping diagram of Dy, and FIG. 4E is a mapping diagram of La. FIG. 5 shows cross sections of the rare earth sintered magnet 1 of Example 7 evaluated under the above-described evaluation conditions, in which FIG. 5A is a compositional image in backscattered electron mode, FIG. 5B is a mapping diagram of Nd, FIG. 5C is a mapping diagram of Sm, FIG. 5D is a mapping diagram of Tb, and FIG. 5E is a mapping diagram of La.

It is confirmed from FIG. 4 and FIG. 5 that the rare earth sintered magnets 1 produced by the manufacturing method according to the present embodiment have the following magnet internal structures. FIG. 4A and FIG. 5A show that there are a plurality of regions of the main phase 2, and the grain boundary phase 3 formed among the plurality of regions of the main phase 2. FIG. 4B and FIG. 5B show that Nd is present throughout the grain boundary phase 3. FIG. 4C and FIG. 5C show that a part of the grain boundary phase 3 has Sm enriched portions 4, and the content of Sm is higher in the grain boundary phase 3 than in the main phase 2. FIG. 4D and FIG. 5D show that there are heavy rare earth element RH enriched portions 5 in at least a part of the grain boundary phase 3 on the peripheries of the Sm enriched portions 4, and the content of the heavy rare earth element RH is higher in the grain boundary phase 3 than in the main phase 2. FIG. 4E and FIG. 5E show that La, like Nd, is present throughout the grain boundary phase 3.

Embodiment 3

Figure 6:
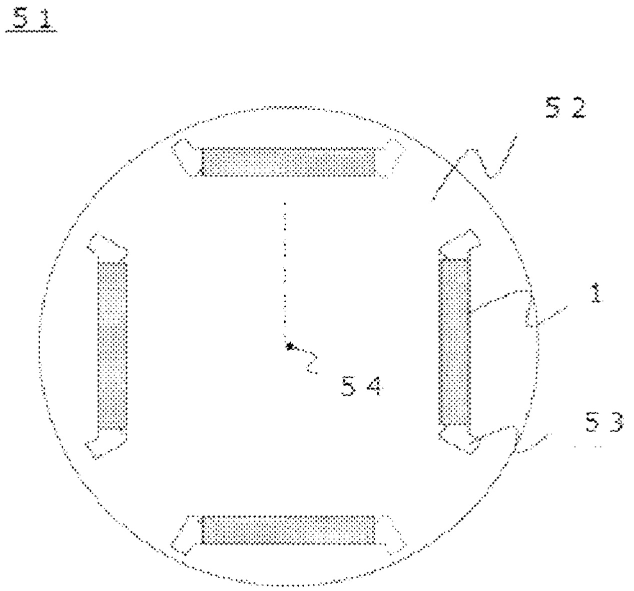
FIG. 6 is a schematic cross-sectional view of a rotor according to Embodiment 3.

The present embodiment relates to a rotor 51 that includes the rare earth sintered magnet 1 according to Embodiment 1. The rotor 51 according to the present embodiment is described with reference to FIG. 6. FIG. 6 is a schematic cross-sectional view perpendicular to an axial direction of the rotor 51.

The rotor 51 is rotatable about an axis of rotation 54. The rotor 51 includes a rotor core 52 and a plurality of rare earth sintered magnets 1 inserted into magnet insertion holes 53 provided in the rotor core 52 along a circumferential direction of the rotor 51. FIG. 6 shows an example including four magnet insertion holes 53 and four rare earth sintered magnets 1; however, the number of magnet insertion holes 53 and the number of rare earth sintered magnets 1 may be changed according to the design of the rotor 51. The rotor core 52 is formed of a plurality of disk-shaped electromagnetic steel plates stacked in the axial direction of the axis of rotation 54.

The rare earth sintered magnets 1 are manufactured according to the manufacturing method of Embodiment 2. The four rare earth sintered magnets 1 are inserted into their respective magnet insertion holes 53. The four rare earth sintered magnets 1 are magnetized in such a way that, on the radially outer side of the rotor 51, each of the rare earth sintered magnets 1 has a polarity different from that of the adjacent rare earth sintered magnets 1.

As described above, the rotor 51 according to the present embodiment includes the rare earth sintered magnets 1 according to Embodiment 1, which allows the heavy rare earth element RH to diffuse deeper into the rare earth sintered magnet 1 while suppressing the deterioration of the magnetic properties, and enables small coercive force difference in the rare earth sintered magnet 1 while maintaining a high residual magnetic flux density; therefore, the deterioration of the magnetic properties is suppressed even in high-temperature environments where the temperature exceeds 100 deg C. This stabilizes the operation of the rotor 51 even in high-temperature environments where the temperature exceeds 100 deg C.

Embodiment 4

Figure 7:
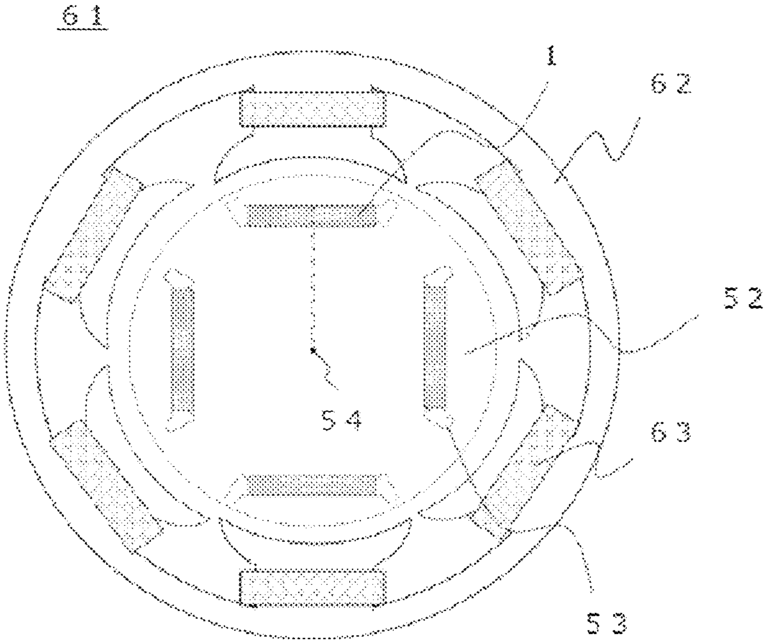
FIG. 7 is a schematic cross-sectional view of a rotating machine according to Embodiment 4.

The present embodiment relates to a rotating machine 61 provided with the rotor 51 according to Embodiment 3. The rotating machine 61 according to the present embodiment is described with reference to FIG. 7. FIG. 7 is a schematic cross-sectional view perpendicular to an axial direction of the rotating machine 61.

The rotating machine 61 includes the rotor 51 according to Embodiment 3 and an annular stator 62 provided coaxially with the rotor 51 and disposed facing the rotor 51. The stator 62 is formed of a plurality of electromagnetic steel plates stacked in the axial direction of the axis of rotation 54. The configuration of the stator 62 is not limited to this, and existing configurations may be employed. The stator 62 is provided with windings 63. The windings 63 may be wound in a concentrated manner or a distributed manner, for example. The number of magnetic poles of the rotor 51 in the rotating machine 61 should be two or more; in other words, the number of rare earth sintered magnets 1 should be two or more. FIG. 7 shows an example of a magnet-embedded type rotor 51; however, a surface-magnet type rotor 51 having the rare earth magnets fixed to the outer periphery with adhesive may also be used.

As described above, the rotating machine 61 according to the present embodiment includes the rare earth sintered magnets 1 according to Embodiment 1, which allows the heavy rare earth element RH to diffuse deeper into the rare earth sintered magnet 1 while suppressing the deterioration of the magnetic properties and enables small coercive force difference in the rare earth sintered magnet 1 while maintaining a high residual magnetic flux density; therefore, the deterioration of the magnetic properties is suppressed even in high-temperature environments where the temperature exceeds 100 deg C. This stabilizes the drive of the rotor 51 and the operation of the rotating machine 61 even in high-temperature environments where the temperature exceeds 100 deg C.

REFERENCE SIGNS LIST

1 rare earth sintered magnet
2 main phase

3 grain boundary phase
4 Sm enriched portion
5 heavy rare earth element RH enriched portion
11 raw alloy production process
12 melting process
13 primary cooling process
14 secondary cooling process
21 sintered magnet production process
22 pulverization process
23 molding process 23
24 sintering-and-aging process
31 grain boundary diffusion process
32 adhesion process
33 diffusion process
41 crucible
42 molten alloy
43 tundish
44 rotator
45 solidified alloy
46 tray
47 rare earth magnet alloy
51 rotor
52 rotor core
53 magnet insertion hole
54 axis of rotation
61 rotating machine
62 stator
63 winding

The invention claimed is:

1. A rare earth sintered magnet comprising:

a plurality of regions of a main phase each having an $R_2Fe_{14}B$ crystal structure containing at least Nd and Sm as rare earth elements R; and a grain boundary phase formed among the plurality of regions of the main phase, wherein the grain boundary phase has a higher content of Sm than that in the main phase, and has, in part of the grain boundary phase, Sm enriched portions in which Sm is enriched by Sm substitution in a crystalline NdO phase and heavy rare earth element RH enriched portions in which a heavy rare earth element RH is enriched at least on part of peripheries of the Sm enriched portions.

2. The rare earth sintered magnet according to claim 1, wherein the heavy rare earth element RH enriched portions are selectively formed on the peripheries of the Sm enriched portions.

3. The rare earth sintered magnet according to claim 1, wherein the heavy rare earth element RH enriched portions are formed so as to surround entire peripheries of the Sm enriched portions.

4. The rare earth sintered magnet according to claim 1, wherein, in the Sm enriched portions, Sm is enriched to an extent that can be confirmed by elemental analysis using an electron probe microanalyzer.

5. The rare earth sintered magnet according to claim 1, wherein, in the heavy rare earth element RH enriched portions, the heavy rare earth element RH is enriched to an extent that can be confirmed by elemental analysis using an electron probe microanalyzer.

6. The rare earth sintered magnet according to claim 1, wherein the Sm enriched portions are dispersed throughout the grain boundary phase from a surface layer to a center of the rare earth sintered magnet.

7. The rare earth sintered magnet according to claim 1, wherein a content of the heavy rare earth element RH is higher in the grain boundary phase than in the main phase.

8. The rare earth sintered magnet according to claim 1, wherein the rare earth element R includes La.

9. A method of manufacturing the rare earth sintered magnet according to claim 1, the method comprising:

a pulverization process of pulverizing an R—Fe—B system rare earth magnet alloy containing Nd and Sm as rare earth elements R;

a molding process of molding a powder of the R—Fe—B system rare earth magnet alloy to produce a compact;

a sintering-and-aging process of sintering the compact at a temperature between 600 deg C and 1300 deg C, inclusive, and aging the compact at a temperature lower than a temperature of the sintering to produce a sintered compact; and a grain boundary diffusion process of adhering the heavy rare earth element RH to the sintered compact and performing a heat treatment to diffuse the heavy rare earth element RH into a grain boundary.

10. The method of manufacturing the rare earth sintered magnet according to claim 9, wherein the heat treatment in the grain boundary diffusion process is performed at a temperature lower than the temperature of the sintering.

11. A rotor comprising:

a rotor core; and the rare earth sintered magnet according to claim 1 provided in the rotor core.

12. A rotating machine comprising:

the rotor according to claim 11; and a stator disposed to face the rotor.

* * * * *